United States Patent [19]

Amundson

[11] Patent Number: 4,680,773
[45] Date of Patent: Jul. 14, 1987

[54] DATA TELECOMMUNICATIONS SYSTEM AND METHOD UTILIZING A MULTI-MODE MODEM

[75] Inventor: Anthony P. Amundson, Holliston, Mass.

[73] Assignee: Microcom, Inc., Norwood, Mass.

[21] Appl. No.: 792,766

[22] Filed: Oct. 30, 1985

[51] Int. Cl.$^4$ ............................................. H04B 1/38
[52] U.S. Cl. ...................................... 375/8; 375/121; 371/32
[58] Field of Search ................... 375/7, 8, 121, 107, 375/109; 370/79, 17, 31, 94 U, 84; 371/32

[56] References Cited

U.S. PATENT DOCUMENTS

| | | | |
|---|---|---|---|
| 3,457,550 | 7/1969 | Gibson et al. | 375/121 |
| 3,657,700 | 4/1972 | Lutzker | 371/37 |
| 4,069,392 | 1/1978 | Goldenberg et al. | 370/84 |
| 4,270,205 | 5/1981 | DeShon | 371/32 |
| 4,357,700 | 11/1982 | Alvarez, III et al. | 370/79 |
| 4,377,862 | 3/1983 | Koford et al. | 371/32 |
| 4,425,664 | 1/1984 | Sherman et al. | 375/8 |
| 4,470,127 | 9/1984 | Thompson | 364/900 |

Primary Examiner—Benedict V. Safourek
Assistant Examiner—M. Huseman
Attorney, Agent, or Firm—Pahl, Lorusso & Loud

[57] ABSTRACT

A data telecommunications system and method is provided for sending a data stream of characters between two pieces of data terminal equipment (which can be either terminals and/or computers) connected over communication lines. A modem is connected between each piece of data terminal equipment and the communication lines, and at least one of the modems is capable of operating in both a special mode which provides optimized data transmission and a normal mode which provides direct non-optimized data transmission. Upon detection of a special mode indicating character, a modem of the data telecommunication system of the present invention will establish a link under the special mode protocol. In one embodiment, when a second special character is detected by the modem, the modem is caused to operate in a normal mode. In an alternate embodiment, the modem will store characters in a special buffer memory until either the special mode-indicating character is detected or until the buffer fills. If the buffer fills, the modem begins operation in a normal mode and the characters stored in the buffer are transmitted prior to the transmission of the remaining characters in the data stream.

25 Claims, 4 Drawing Figures

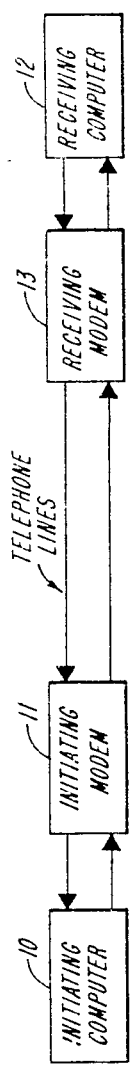
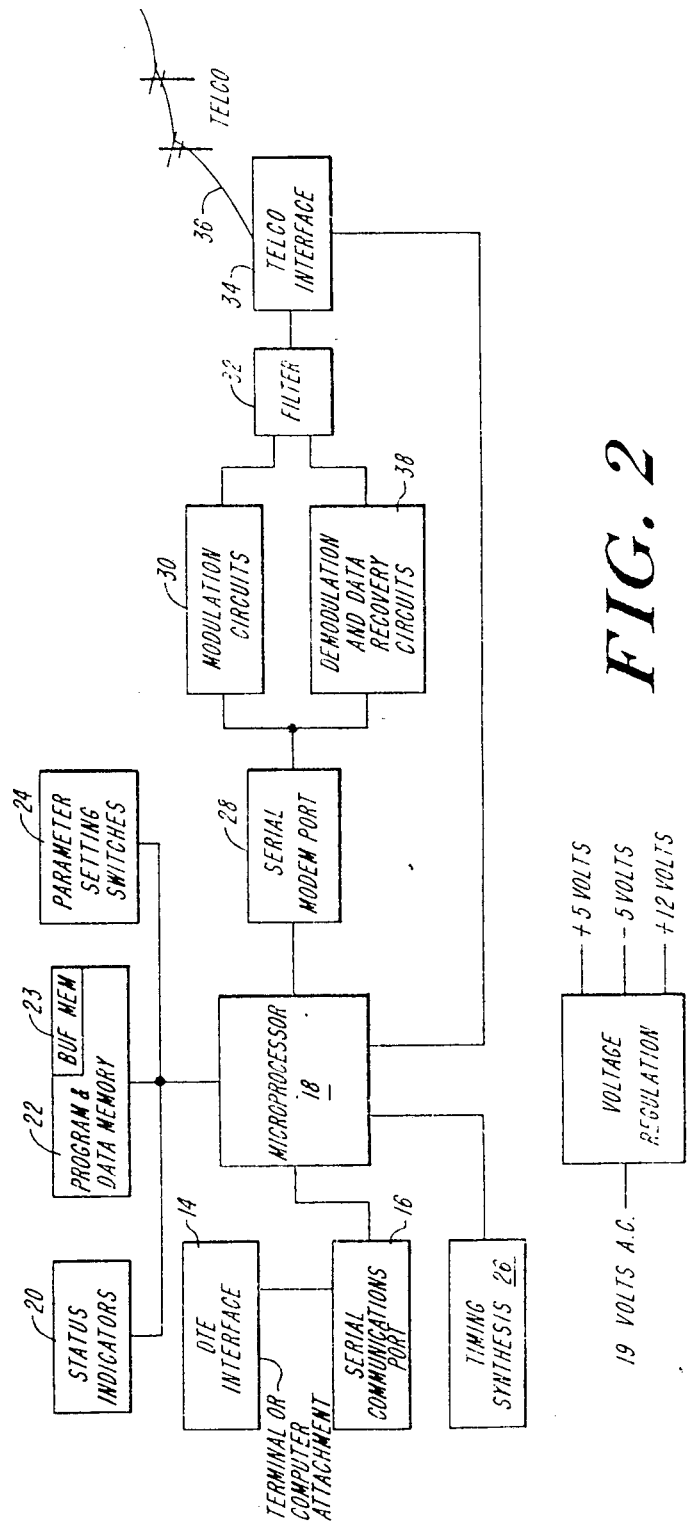
FIG. 1
FIG. 2

DATA TELECOMMUNICATIONS SYSTEM AND METHOD UTILIZING A MULTI-MODE MODEM

BACKGROUND OF THE INVENTION

This invention relates generally to a data telecommunications system, and more particularly to a system including a modem that preserves all data transmitted between two microcomputers over telephone lines including data transmitted prior to the establishment of a data transfer link.

Whereas microcomputers were once only used as dedicated and completely isolated devices, they are now used for a wide range of applications, many of which require microcomputers to communicate with each other. Problems develop with such communication because of the existence of a wide variety of microcomputers which are incapable of directly communicating with each other. As a result, many data communication systems for microcomputers force the microcomputer to work principally as a dumb terminal for a remote mini- or mainframe computer. Therefore, to facilitate more sophticated communication, communication protocols which enable data communications between a wide range of computers, from low end microprocessors to large mainframes, have been developed. The proliferation of protocols, however, not to mention operating systems and microprocessors, has for the most part precluded the adoption of a standard file transfer method.

A communication protocol is basically a set of rules that defines how the computers interact. For two computers to transfer a file successfully, they must observe the same protocol. Typically, a protocol specifies when to send a message, how to format the information in the message, and at the other end, how to acknowledge the receipt of the message.

Simple physical connect protocols are concerned only with hardware configurations. Establishing the basic physical connection between two computers requires that a particular series of steps be followed. The originating modem initiates its sending sequence, and the telephone number representing the electronic address of the receiving modem is formatted as a series of pulses or tones and sent into the telephone network The receiving modem senses the incoming call as a relatively high voltage (sufficient to cause a phone to ring) and interprets this as a request to establish a connection. If the connection is established, an acknowledgement message sent to the transmitting modem thereby establishes the connection. Such a physical link is capable of being established because both modems use the same physical connect protocol. These basic connect protocols are fairly standard, particularly for the low speed, asynchronous modems commonly used with microcomputers, such as Bell 103 and 212A modems. However, as communications become more complex and involve dissimilar machines and file formats, the protocols must, in turn, become increasingly sophisticated.

Connecting two computers is only a small part of the communications work necessary for accurate data transfer. Telephone lines are often noisy, and errors can crop up in the transmitted data. These errors must be detected and corrected. The resources available to store incoming data must also be passed and matched so that the recipient is not flooded with data. Also, information regarding the computer file system must be swapped and file movement and manipulation must be defined. These concerns, therefore, go beyond the physical-level protocols into the realm of complex communications protocols.

One protocol which enables complex communications between microcomputers is the Microcom Networking Protocol (MNP) which has been developed by Microcom Corporation of Norwood, Massachusetts, the assignee of the present application. MNP provides a sophisticated communications system which includes provisions for both reliable terminal-type communications and reliable file transfer in a manner which can reasonably be implemented on a wide range of computers. MNP accounts not only for hardware and operating systems differences, but also provides sophisticated error checking. As a result, file exchanges are thus possible between almost any computers using an MNP based communication system.

The MNP protocol, which has been developed principally for use with microcomputers, includes three layers, and the use of only three layers enables MNP to provide the necessary services with the desired space and performance characteristics for a microcomputer environment. The three layers or modules are combined to perform a series of complex functions in a manner in which changes in one module may not drastically affect another module, as long as certain parts of the module's interface remain the same.

In MNP, each layer is relatively isolated and provides a specific service. If a change is forced in one layer (for example, if MNP is modified for use on a new computer), the change is confined to that layer while the layer's standard interface to the others layers remains unchanged. In addition to ensuring machine portability, MNP's structure allows services provided by one layer to support those in the layer above. The accumulation of services is then passed upward, from layer to layer to the applications program. MNP defines three unique protocol layers in addition to the physical connection: the link, the session, and the file protocol layers. The protocol layers are triggered sequentially from the bottom (physical) to the top (file transfer).

The link layer is responsible for providing reliable, controlled data transmission over a medium that is inherently noisy and likely to cause errors. Once a physical connection is established between two machines, the link protocol acts as a negotiator causing both computers to agree on the nature of the link. For example, the link protocol establishes whether the connection will be half- or full-duplex, how many data messages can be sent before confirmation is required, the size of a single data packet, etc. After extablishing values for the above requirements, the link protocol initiates data transfer, paces the flow of data and, if necessary, retransmits data messages that contain errors due to telephone line noise. The link protocol allows blocks or packets of data (as opposed to individual bytes) to be sent synchronously or asynchronously to the receiving computer. Data transfer is thus faster when packets are transmitted synchronously because start and stop characters are not needed, and as a result, the ratio of data to control characters regulating the transfer is higher. Control is possible because of a mainframe-like (framing) technique in which a block of data is carried from both ends with specific codes.

The session layer negotiates with the receiving computer with respect to the pertinent system and file information including computer type, how files are formatted, the type of information transmitted (e.g. ASCII, binary) and the user's identity. This layer also provides the automatic negotiation of which level of service can be used between the two communicating devices.

The file transfer layer defines and formats the messages involved in file transfers and manipulations. There are three transfer services available: one allowing the sending of a file, the second allowing the receipt of a file, and the third allowing the appending of a file to an existing file at the other end of the communications link. The file transfer protocol also enables the manipulation of distant computer files. For example, such files can be deleted, renamed or file directories may be displayed. A typical file transfer starts when one computer sends a "file start" message to the other computer. The file start message includes the requested file's name, size and format along with any password needed for the file's return trip to the requesting computer. Both computers exchange "hellos" along with a confirmation that a file will be soon filed by one side and accepted by the other.

In order for any communications protocol to facilitate communications among a wide variety of computers, the protocol must be able to operate in a number of modes. These modes include a matched-protocol mode for use by two communicating devices supporting the sax'e protocol. Such a matched-protocol mode may provide optimized data transmission including any of a number of known optimizing features such as detecting and correcting errors, optimizing transmission speed, etc. A second mode which allows straight forward data transmission (without any optimizing features) between two communicating systems must also be provided. The operating mode is generally negotiated in a lower link layer, and in MNP the mode is selected in the link layer.

A modem operating under the MNP protocol discussed above has four basic modes: reliable mode, normal mode, auto-reliable mode, and direct mode. The reliable mode is the basic matched-protocol mode of MNP which provides error detection and automatic retransmission of data when an error occurs in order to ensure that communications between two communicating systems are error-free. In order to utilize this reliable mode, however, both of the communicating modems must be able to support this mode. A second mode, MNP's normal mode, allows a modem with MNP to communicate with a modem not supporting this protocol. MNP's auto-reliable mode is an extension of the reliable mode which will automatically connect two modems in a reliable mode if such a connection is possible. In other words, if both of the communicating modems can support MNP, a reliable, error-correcting connection is established. The auto-reliable mode differs from the reliable mode insofar as the modem in the auto-reliable mode initially looks for incoming MNP protocol characters from the remote modem. If, after a predetermined amount of time has expired, these MNP characters are not detected a normal link is established. If these characters are detected, a reliable link is established. A fourth mode, the direct mode, is used for special purpose formats or character sets, and the modem buffers and flow control command settings are ignored.

In a modem which has an auto-reliable mode similar to the type described above, there is usually a three to ten second window where the modems are expecting a link layer request message from the originating modem. Generally, the answering modem is looking for specific characters which will indicate that the initiating modem is operating under a matched-protocol. The receiving modem will examine the incoming data stream for a predetermined period of time (usually three to ten seconds), and if during that period of time the special protocol indicating characters are not recognized, the modem will begin operation in a normal mode. Problems arise when data transmitted during the three to ten second window prior to the establishment of a non-matched-protocol or normal mode protocol link is lost because no protocol link was established while the data was being transmitted.

It is therefore a principal object of the present invention to provide a data telecommunications system including at least one modem capable of reliably establishing communication with other modems operating under any of a variety of protocols.

Another object of the present invention is to provide a data telecommunication system including at least one modem capable of operating under a number of protocols which preserves all data while attempting to establish the proper mode under which to operate.

A further object of the present invention is to provide a data telecommunication system which will quickly and reliably select the appropriate mode under which any two physically connected modems can operate.

SUMMARY OF THE INVENTION

In accordance with the present invention, a data telecommunications system and method is provided for sending a data stream of characters between two units of data terminal equipment (which can be either terminals and/or computers) connected over communication lines. A modem is connected between each piece of data terminal equipment and the communication lines, and at least one of the modems is capable of operating under both a special mode which provides optimized data transmission and a normal mode which provides direct non-optimized data transmission. Upon detection of a special mode indicating character, a modem of the data telecommunications system of the present invention will establish operation under the special mode. In one embodiment, when a second special character is detected by the modem, the modem initiates operation in a normal mode. In an alternate embodiment, the modem will store characters in a special buffer memory until either the special mode-indicating character is detected or until the buffer fills. If the buffer fills, the modem begins operation in a normal mode and the characters stored in the buffer are transmitted prior to the transmission of the remaining characters in the data stream.

These and other objects and features of the present invention will be better understood from the following detailed description which should be read in light of the accompanying drawings in which corresponding reference numerals refer to corresponding parts throughout the several views.

BRIEF DESCRIPTION OF THE DRAWINGS

FIG. 1 is a generalized schematic view of a data telecommunications system;

FIG. 2 is a schematic view of a modem of the present invention;

Figure 3:
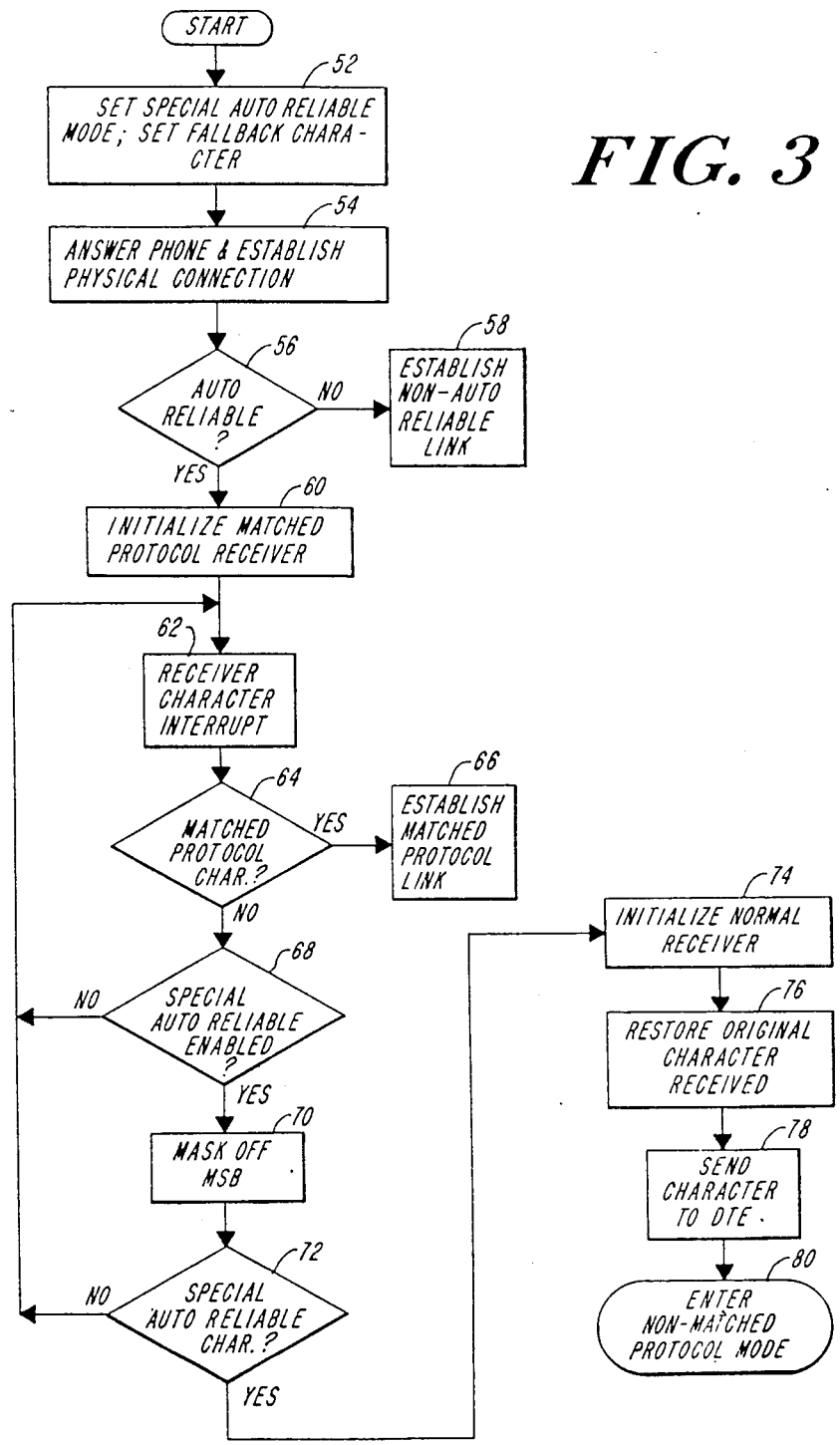
FIG. 3 is a flow diagram of the steps utilized by a modem in selecting an operating mode according to the present invention.

Appendix A is a listing of computer instructions utilized by the modem of the present invention for carrying out the method of the invention.

DETAILED DESCRIPTION OF THE PREFERRED EMBODIMENT

A basic data telecommunications system, shown in FIG. 1 includes an initiating unit of data terminal equipment 10, which may be either a dumb terminal or a microcomputer, and a receiving unit of data terminal equipment (DTE) 12. An initiating modulator/demodulator (modem) 11 is connected between unit 10 and communication lines (such as, but not limited to telephone lines), and a receiving modem 13 is connected between unit 12 and communication lines.

A modem of the communication system of the present invention is shown in FIG. 2. While the system of the present invention will include at least one modem of the type described below, it is preferable that both modems be of this type. For purposes of the following discussion, the modem of the system will be described with reference to modem 13. The modem 13 includes a DTE-interface 14 which receives data coming from DTE unit 12. Data characters supplied to the DTE-interface 14 pass onto a serial communications port 16 of the microprocessor 18. The microprocessor 18 has connected to it status indicators 20, a program and data memory 22 and parameter setting switches 24. Timing synthesizing circuitry 26 is also connected to the microprocessor 18. Data passing through the microprocessor 18 is sent through a serial modem port 28 to modulation circuits 30 which will pass data on through a filter 32 to a telephone interface 34 and then onto telephone lines over which the data will be transmitted to another microcomputer. The modem 13 also includes demodulation and data recovery circuits 38 which are used for receiving data from another remotely situated modem, such as modem 11. When the modem 13 acts as a receiving modem, data passes through the same elements described above in a reverse order following the passage of data through the demodulation and data recovery circuits 38.

For purposes of the following discussion, the "auto-reliable" mode refers to a mode of operation of a modem in which a matched-protocol link is automatically established if both modems are capable of operating under such a matched-protocol. If both modems cannot operate under the matched-protocol, a normal mode connection is automatically established.

Referring to FIG. 3, in the present invention, a modem capable of operating under an auto-reliable mode is enabled for operation in the auto-reliable mode in step 50. A special or "fallback" character or set of characters that indicate that a non-matched-protocol link should be established are set in step 52. Such charcters are generally the first characters sent by a computer of the type which will attempt to establish a connection with receiving unit 12. When a call is received by a receiving modem 13, a physical connection is established in step 54. The receiving modem then, in step 56, determines whether the auto-reliable mode has been set thereby indicating that the receiving modem can operate in an auto-reliable mode. If the auto reliable mode is not set, the receiving modem 13 will establish a non-auto-reliable link in step 58 which link may be either a matched- or a non-matched-protocol link. If the auto-reliable mode is in effect, the receiving modem is initialized for operation in step 60.

The receiving modem 13 begins character sampling in step 62 with the issuing of a character interrupt. If the character necessary for initiating a matched-protocol link is detected in step 64, the modem 13 will then attempt to establish that protocol link in step 66. If, in step 64, the necessary character for signaling a desire to establish a matched-protocol link is not detected, the modem 13 then establishes, in step 68, whether the modem is enabled to operate in a "special" auto-reliable mode and thereby recognize the fallback character or set of characters indicating the desire of the initiating modem 11 to establish a non-matched-protocol link. If modem 13 is not enabled to recognize the fallback character(s), the receiving modem 13 continues the sampling of the input character stream for a predetermined set period of time until one of two events occur. First, if the necessary character for establishing a matched-protocol link is sensed, then the modem 13 will attempt to establish the matched-protocol link and the looping will discontinue. In the alternative, if during the preset time limit for establishing a matched-protocol link, no link has actually been established, then the time-out mechanism of the modem will cause a ceasing of operation and a switch to operation under the non-matched protocol. If the modem 13 is enabled to detect a specific character for establishing a non-matched-protocol mode connection, then in step 70, the most significant bit is masked off the data character under examination. The reason for this masking off of the most significant bit is that the most significant bit serves as a parity bit and is not needed for the determination of the operating mode.

After masking off the most significant bit in step 70, the modem 13 will determine in step 72 whether the character currently under examination is actually the fallback character. If the examined character is not the fallback character, then control returns to step 62, and another character interrupt is received and the next character in the data stream is returned. If, on the other hand, the fallback character is detected, the modem 13 initializes itself for operation under a non-matched-protocol mode in step 74, and the fallback character is restored by replacing the most significant bit in step 76. The restored character is then sent to the computer or terminal through the serial communications port 16 in step 78. From this point onward, the modem 13 will operate in a non-matched-protocol mode without any error detection or other special features normally associated with the matched-protocol mode.

Figure 4:
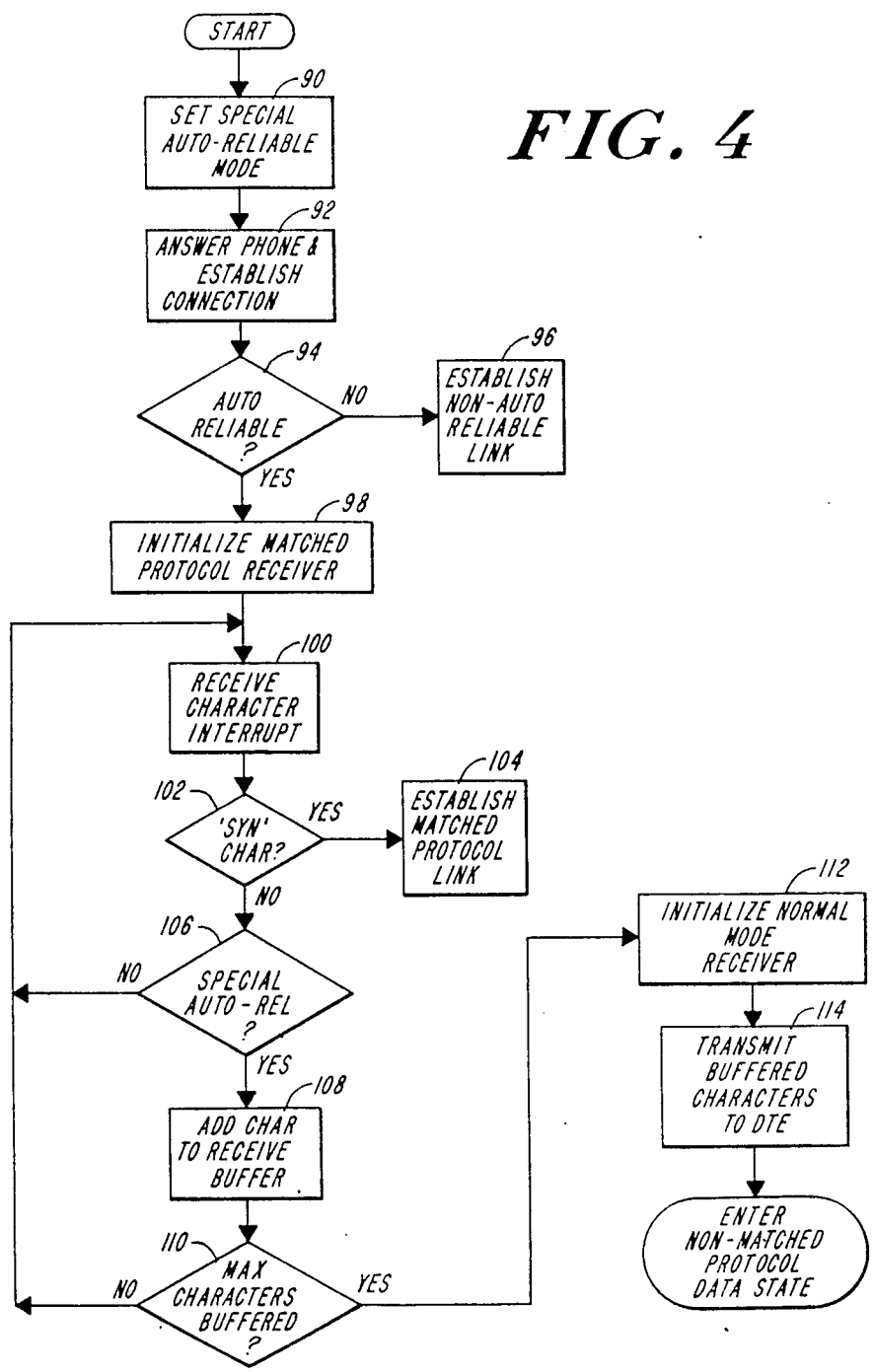
FIG. 4 is an alternate embodiment of the steps utilized by a modem of the present invention for selecting an operating mode.

Referring now to an alternate embodiment of the present invention shown in FIG. 4, the modem 13 is enabled for operation in a special auto-reliable mode in step 90. When the modem 13 receives a phone call from an initiating modem 11, modem 13 answers the phone and establishes a physical link in step 92. At this point, as in step 56 of the embodiment of FIG. 3, the modem 13 determines, in step 94, whether it is enabled to operate in an auto-reliable mode. If the auto-reliable switch is not actuated, the modem will establish a non-auto-reliable link in step 96 which link may be either a matched- or non-mached-protocol link. If, on the other hand, the modem 13 is in the auto-reliable mode, the modem will initialize itself in step 98.

Following initialization, a character interrupt is issued, and the first data character in the data stream is fetched by modem 13 in step 100. The fetched character is examined in step 102, and if the matched-protocol indicating character is detected, the modem will attempt to establish a matched-protocol link in step 104. If, on the other hand, the matched-protocol indicating character was not detected, then, in step 106, the modem 13 will determine whether it is enabled to operate in the special auto-reliable mode in step 68. If the modem 13 is not enabled for the special auto-reliable mode, then the modem will return control to step 100 where the modem will issue another character interrupt and continue to search the character string for the proper matched-protocol indicating character. If, on the other hand, the special auto-reliable mode is enabled, the character is placed in a character buffer 23 in the program and data memory 22 of modem 13. In step 110 the modem determines whether the buffer 23 has been filled, and if buffer 23 is not filled, then control shifts to step 100 and another character interrupt is issued for the next character in the data stream. If the character buffer 23 has filled, the modem 13 initializes itself to operate under a non-matched-protocol mode in step 112, and in step 114 the buffered characters are transmitted through serial port 16 and DTE-interface 14 to the terminal or computer 12 to which the modem 13 is connected. At this point, communications will continue with the modem operating in a non-matched-protocol mode.

The modem of the data telecommunication system of the present invention provides several advantages over known modems which are capable of distinguishing between one or more modes of operation. In particular, both of the embodiments described above protect the initial data sent over the telephone lines to a receiving modem so that the receiving modem can operate safely in either a matched-protocol enviornment or in a non-matched-protocol mode which does not include the error correcting and other features of the matched-protocols. A modem operating in the special auto-reliable mode of the first embodiment discussed above provides advantages over the second embodiment insofar as a modem of the first embodiment will begin transmission more quickly following the establishment of a physical connection because it does not have to wait for the buffer to fill to begin operation in a non-matched-protocol mode. In addition, no additional portion of the memory 22 need be set aside to accomodate a buffer area. On the other hand, the FIG. 4 embodiment will provide slightly more efficient and reliable operation insofar as should the fallback character be lost or incorrectly transmitted due to noise or other interference over a telephone line, the modem will still operate under the non-matched-protocol mode when it is proper to do so without losing any data. Both embodiments, however, provide advantages over know apparatus and methods for establishing a matched-protocol-type link.

While the foregoing invention has been described with reference to its preferred embodiments, variations and modifications will occur to those skilled in the art. Such variations and modifications are intended to fall within the scope of the appended claims.

APPENDIX A

```
0072           219 LW01
0072           220       SETFLG  L_SCAN,LCBLSW2   ;enable smart auto-reliable mode
0077           221 LW03
0077 3E50      222       LD      A,80
0079 320000    223       LD      [TICKER],A       ;reset one second timer constant
               224 ;
007C 3E05      225       LD      A,ARWAIT         ;get time to wait (5 seconds)
007E 0607      226       LD      B,FX_FRCV        ;wait for frame received
0080 CD0000    227       CALL    FEND             ;wait a bit
0083 D8        228       RET     C                ;timeout...return
0084           229       TSTFLG  L_PROT,LCBLSW2   ;terminal connection?
0089 2802      230       JR      Z,LW02           ;if so go on
008B           231       RETSCF                   ;else return with carry set
               232 ;**************************************************************
               233
               218 ;
00A0           219       TSTFLG  L_PROT,LCBLSW2   ;are we in terminal mode?
00A5 2036      220       JR      NZ,RF7_A         ;if so go on
               221 ;
00A7 3A0000    222       LD      A,[AUTOBUF]      ;get auto-reliable mode
00AA FE02      223       CP      L_AUT2           ;special character recognition?
00AC 201A      224       JR      NZ,RF7_B         ;if not go on
00AE 79        225       LD      A,C              ;recover character
00AF E67F      226       AND     07FH             ;mask MSB
00B1 47        227       LD      B,A
00B2 3A0000    228       LD      A,[SMCHAR]       ;get character to check against
00B5 B8        229       CP      B                ;is this it?
00B6 2049      230       JR      NZ,RF91          ;if not go on
00B8 79        231       LD      A,C
```

```
0089 CD0000    232          CALL    MMOBPUT
00BC          233 RF7_C
00BC          234          SETFLG  L_PROT,LCBLSW2    ;set terminal connect mode
00C1 3E07     235          LD      A,PK_FRCV         ;signal frame received
00C3 CD0000   236          CALL    UNPEND
00C6 1839     237          JR      RF91
              238
    (00C8)    239 RF7_B    EQU     $
00C8 FE01     240          CP      L_AUT1            ;in mode 1?
00CA 2035     241          JR      NZ,RF91           ;if not go on
00CC 79       242          LD      A,C               ;recover character
00CD CD0000   243          CALL    MMOBPUT           ;add character to buffer
00D0 2A0000   244          LD      HL,[HMOBCNT]      ;get character count
00D3 0100C8   245          LD      BC,200            ;if 200 characters...we are done
00D6          246          ZCF
00D7 ED42     247          SBC     HL,BC
00D9 28E1     248          JR      Z,RF7_C           ;if buffer is full we are done
00DB 1824     249          JR      RF91              ;else continue to buffer
00DD          250 RF7_A
00DD 79       251          LD      A,C               ;recover character
00DE CD0000   252          CALL    MMOBPUT           ;add character to buffer
00E1 181E     253          JR      RF91              ;else continue to buffer
              254 ;
00E3          255 RF71     CLRFLG  L_SCAN,LCBLSW2    ;be sure scan mode off
00E8 3E08     256          LD      A,8               ;yes-DLE next
00EA C3002E   257          JP      RCVEXIT
              258 ;
              182 ; If the link has been established, go to link data phase.
              183 ; Otherwise take action depending on the mode - close link
              184 ; if we are in 'reliable link' mode, go to normal data if
              185 ; we are in 'auto-reliable'.
              186 LX2      CLRFLG  HCALLAB,HASSTAT   ;be sure abort if off
              187          JR      NC,LX3            ;go on if OK
              188 ;
              189          LD      A,[MCBOM]         ;get current mode
              190          CP      MDM_RL            ;reliable link?
              191          JP      Z,LCLOSE          ;yes-go close down link
              192
              193          IF TELENET
              194
              195          TSTFLG  L_PROT,LCBLSW2    ;did we detect a smart-normal connection?
              196          JR      NZ,SMART          ;if so go on
              197          XOR     A                 ;else clear send char...
              198          LD      [AUTOCHAR],A
              199 SMART    EQU     $
              200 ; Force direct connect to disable XON/XOFF for Telenet special
              201 ;
              202          TSTFLG  L_SM,MCBMDE       ;already changed modes?
              203          JR      NZ,LX2T           ;yes, go on
              204          LD      A,[MCBOM]         ;get modem mode
              205          LD      [OLDMODE],A       ;and save in old mode
              206 LX2T     LD      A,MDM_DC          ;set modem mode to direct
              207          LD      HL,MCBOM
              208          SETSTAT
              209          SETFLG  L_SM,MCBMDE       ;set changed mode flag
              210          JP      DATADIR           ;else go to direct mode
              211          ENDIF
```

```
212         IF  GEISCO.OR.UNINET
213         TSTFLG  L_PROT,LCBLSW2    ;did we detect a smart-normal connection?
214         JR      NZ,SMART          ;if so go on
215         XOR     A                 ;else clear send char...
216         LD      [AUTOCHAR],A
217 SMART   EQU     $
218         JP      AUTONORM          ;else go to normal mode
219         ENDIF
220         JP      AUTONORM          ;go to normal mode
221 ;
```

What is claimed is:

1. A method of initiating data telecommunications between two units of data terminal equipment over communication lines, each unit of said data terminal equipment having a modem connected between the unit and the communication lines, at least one of said modems being capable of operating under a special mode and under a normal mode, said special mode providing optimized data transmission that paces the flow of data between said two modems and provides error detection in a transmitted data stream by a receiving modem and automatic retransmission of said data stream by an initiating modem when an error occurs and said normal mode providing direct, non-optimized data transmission that provides transmission of the data stream without any analysis of the data stream, said method comprising the steps of:
   (a) establishing a physical connection between said initiating modem and said receiving modem;
   (b) transmitting a stream of data characters from said initiating modem of said receiving modem over communication lines;
   (c) examining in said receiving modem a next character in said data stream transmitted by said initiating modem to said receiving modem;
   (d) attempting to establish a special mode link between said initiating and receiving modems if said next character examined by said receiving modem is a special mode indicating character and attempting to establish a normal mode link if said character is a normal mode indicating character;
   (e) repeating steps (c) through (d) after fetching a new data character from the data stream until either a special mode indicating character or a normal mode indicating character is detected or until a preselected period of time has elapsed;
   (f) continuing the transmission by said initiating modem of said stream of data if a special or normal mode link is established until said stream is transmitted.

2. The method of initiating data telecommunications of claim 1 further comprising the step of actuating a switch on said receiving modem to recognize either said special mode indicating character or said normal mode indicating character prior to establishing a physical connection between said initiating modem and said receiving modem.

3. The method of initiating data telecommunications of claim 1 further comprising the step of setting said normal mode indicating character by said initiating modem prior to establishing a physical connection between said initiating modem and said receiving modem.

4. The method of initiating data telecommunications of claim 1 further comprising the step of saving said normal mode indicating character by said receiving modem after said normal mode indicating character is detected.

5. The method of initiating data telecommunications of claim 4 further comprising the step of transmitting said saved normal mode indicating character from said receiving modem to a receicing unit of data terminal equipment prior to transmitting a remainder of said stream of data characters from said receiving modem to said receiving unit of data terminal equipment.

6. A method of initiating data telecommunications between two units of data terminal equipment over communication lines, each unit of said data terminal equipment having a modem connected between said unit and the communication lines, at least one of said modems being capable of operating under a special mode and under a normal mode, said special mode providing optimized data transmission that paces the flow of data between said modems and provides error detection in a transmitted data stream and automatic retransmission of said data stream by an initiating modem when an error occurs and said normal mode providing direct, nonoptimized data transmission that provides transmission of the data stream without any analysis of the data stream, said method comprising the steps of:
   (a) transmitting a stream of data characters from an initiating modem to a receiving modem over communication lines;
   (b) examining a next character in said data stream transmitted to said receiving modem;
   (c) attempting to establish a special mode link between said initiating and receiving modem if said next character is a special mode indicating character;
   (d) storing said next character in a character buffer if said special mode indicating character is not detected;
   (e) repeating steps (b) through (d) until a special mode indicating character is detected or until said character buffer fills up;
   (f) if said character buffer fills up, establishing a normal mode link with the characters in the buffer being sent to said unit of data terminal equipment upon the establishing of a normal mode link;
   (g) continuing the transmission of said data stream after said special mode or said normal mode link is established until said stream is fully transmitted.

7. The method of initiating data telecommunications of claim 6 further comprising the step of enabling said receiving modem to store non-special mode indicating characters following the establishment of a physical link between said initiating modem and said receiving modem.

8. A data telecommunications system for providing data communications between two units of data terminal equipment over communication lines comprising:
a modem connected between each unit of data terminal equipment and the communication lines, at least one of said modems being a receiving modem capable of operating in a special mode and a normal mode, said special mode provoding optimized data transmission that paces the flow of data between two modems and provides error detection in a transmitted data stream by a receiving modem and automatic retransmission of said data stream by an initiating modem when an error occurs and said normal mode providing direct, non-optimized data transmission that provides simple transmission of the data stream without any analysis of the data stream, said modem capable of operating in said special and normal modes including:
means for transmitting a stream of data characters from an initiating modem to a receiving modem;
means associated with said receiving modem for detecting a special mode indicating character and for detecting a normal mode indicating character in said received stream of data characters;
means for causing receiving modem to operate in said special mode upon the detecting of said special mode indicating character;
means for causing receiving modem to operate in said normal mode upon the detecting of said normal mode indicating character.

9. The data telecommunications system of claim 8 further comprising means to actuate said receiving modems to recognize either said special mode indicating character or said normal mode indicating character.

10. The data telecommunications system of claim 9 wherein said actuating means is a manually operable switch located on the exterior of said modem.

11. The data telecommunications system of claim 8 further comprising means for setting the normal mode indicating character prior to establishing a physical connection between said initiating modem and said receiving modem.

12. The data telecommunications system of claim 8 further comprising means for saving said normal mode indicating character after said normal mode indicating character is detected.

13. The data telecommunications system of claim 12 further comprising means for transmitting said saved normal mode indicating character to a receiving unit of data terminal equipment connected to said receiving modem prior to transmitting a remainder of said stream of data characters.

14. A data telecommunications system for providing data communications between two units of data terminal equipment over communication lines comprising:
a modem connected between each unit of data terminal equipment and the communication lines, at least one of said modems being capable of operating in a special mode and in a normal mode, said special mode providing optimized data transmission that paces the flow of data between said two modems and provides error detection in a transmitted data stream by a receiving modem and automatic retransmission of said data stream by an initiating modem when an error occurs and said normal mode providing direct, non-optimized data transmission that provides transmission of the data stream without any analysis of the data stream, said modem capable of operating in said special and normal modes including
means for receiving a transmitted stream of data characters from an initiating modem;
means for detecting a special mode indicating character in said received stream of data characters;
buffer memory means for storing non-special mode indicating characters in said received stream of data characters;
counter means for counting the number of characters in said buffer memory means in order to determine when said buffer memory means has been filled;
means responsive to said detecting means for causing said modem to operate in said special mode upon detecting of said special mode indicating character;
means responsive to said counter means for causing said modem to operate in said normal mode when said buffer memory means has filled, said means for causing said modem to operate in said normal mode also including means for transmitting characters stored in said buffer memory means to said unit of data terminal equipment to which said modem is connected prior to the transmission of the remainder of said data stream.

15. The data telecommunications system of claim 14 further comprising means for enabling said receiving modem to store non-special mode indicating characters following the establishment of a physical link between said initiating modem and said receiving modem.

16. The data telecommunications system of claim 15 wherein said enabling means is a manually operable switch located on the exterior of said modem.

17. A modem for connecting between a unit of data terminal equipment and communication lines to facilitate data telecommunications, said modem being capable of operating in a special mode and a normal mode, said special mode providing optimized data transmission that paces the flow of data between said two modems and provides error detection in a transmitted data stream by a receiving modem and automatic retransmission of said data stream by an initiating modem when an error occurs and said normal mode providing direct, non-optimized data transmission that provides simple transmission of the data stream without any analysis of the data stream, said modem comprising:
means for receiving a transmitted stream of data characters from an initiating modem;
means for detecting a special mode indicating character and for detecing a normal mode indicating character in said received stream of data characters;
means for causing said modem to operate in said special mode upon the detecing of said special mode indicating character;
means for causing said modem to operate in said normal mode upon the detecting of said normal mode indicating character.

18. The modem of claim 17 further comprising means to actuate said receiving modems to recognize either said special mode indicating character or said normal mode indicating character.

19. The modem of claim 18 wherein said actuating means is a manually operable switch located in the exterior of said modem.

20. The modem of claim 17 further comprising means for setting the normal mode indicating character prior to establishing a physical connection between said initiating modem and said modem.

21. The modem of claim 17 further comprising means for saving said normal mode indicating character after said normal mode indication character is detected.

22. The modem of claim 21 further comprising means for transmitting said saved normal mode indicating character to a receiving unit of data terminal equipment connected to said modem prior to transmitting a remainder of said stream of data characters.

23. A modem for connecting between a unit of data terminal equipment and communication lines to facilitate data telecommunications, said modem being capable of operating in a special mode and in a normal mode, said special mode providing optimized data transmission that paces the flow of data between said two modems and provides error detection in a transmitted data stream by a receiving modem and automatic retransmission of said data stream by an initiating modem when an error occurs and said normal mode providing direct, non-optimized data transmission that provides transmission of the data stream without any analysis of the data stream, said modem comprising:
 means for receiving a transmitted stream of data characters from an initiating modem;
 means for detecting a special mode indicating character in said received stream of data characters;
 buffer memory means for storing non-special mode indicating characters in said received stream of data characters;
 counter means for counting the number of characters in said buffer memory means in order to determine when said buffer memory means had been filled;
 means responsive to said detecting means for causing said modem to operate in said special mode upon the detecting of said special mode indicating character;
 means responsive to counter means for causing said modem to operate in said normal mode when said buffer memory means has filled, said means for causing said modem to operate in said normal mode also including means for transmitting characters stored in said buffer memory means to said unit of data termianl equipment to which said modem is connected prior to the transmission of the remainder of said data stream.

24. The data telecommunications system of claim 23 further comprising means for enabling said receiving modem to store non-special mode indicating characters following the establishment of a physical link between said initiating modem and said receiving modem.

25. The data telecommunications system of claim 24 wherein said enabling means is a manually operable switch located on the exterior of said modem.

* * * * *